United States Patent
Mitani et al.

(10) Patent No.: US 7,134,409 B2
(45) Date of Patent: Nov. 14, 2006

(54) DEPOSIT REMOVAL FOR INTERNAL COMBUSTION ENGINE

(75) Inventors: Shinichi Mitani, Susono (JP); Toshiaki Asada, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 26 days.

(21) Appl. No.: 10/874,267

(22) Filed: Jun. 24, 2004

(65) Prior Publication Data

US 2005/0028764 A1 Feb. 10, 2005

(30) Foreign Application Priority Data

Jun. 30, 2003 (JP) ............................. 2003-186407

(51) Int. Cl.
*F01L 1/34* (2006.01)
(52) U.S. Cl. ............................. 123/90.15; 123/90.17; 123/347
(58) Field of Classification Search ............. 123/90.15, 123/90.16, 90.17, 90.18, 90.27, 90.31, 345, 123/346, 347, 348
See application file for complete search history.

(56) References Cited

U.S. PATENT DOCUMENTS

| 6,283,073 B1 | 9/2001 | Izuo et al. |
| 6,394,051 B1 * | 5/2002 | Filipe et al. ............. 123/90.15 |
| 6,425,357 B1 | 7/2002 | Shimizu et al. |
| 6,776,142 B1 * | 8/2004 | Sukegawa et al. .......... 123/478 |

FOREIGN PATENT DOCUMENTS

| JP | 57191433 A | * | 11/1982 |
| JP | A-4-1404 | | 1/1992 |
| JP | 09303165 A | * | 11/1997 |
| JP | A-2001-289097 | | 10/2001 |

* cited by examiner

*Primary Examiner*—Thomas Denion
*Assistant Examiner*—Ching Chang
(74) *Attorney, Agent, or Firm*—Oliff & Berridge, PLC

(57) ABSTRACT

An internal combustion engine 100 comprises a variable valve mechanism 424 and a deposit removal executing section for removing deposits. The deposit removal executing section controls the variable valve mechanism 424 to increase the flow speed of intake air to internal combustion engine 100, thereby removing deposits adhering in proximity to the intake valve 422.

24 Claims, 15 Drawing Sheets

Fig.3(a)
Fig.3(b)
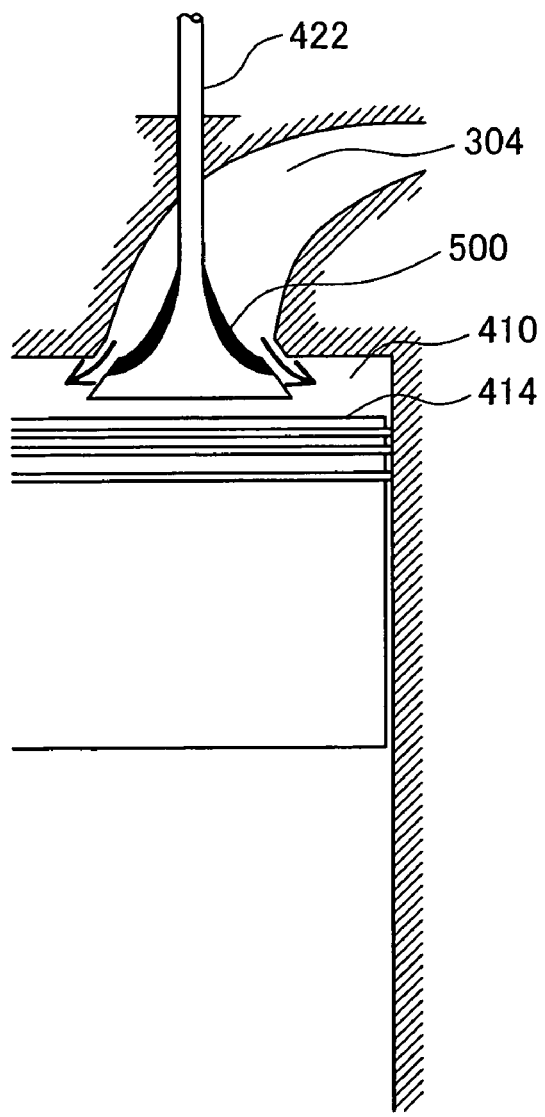
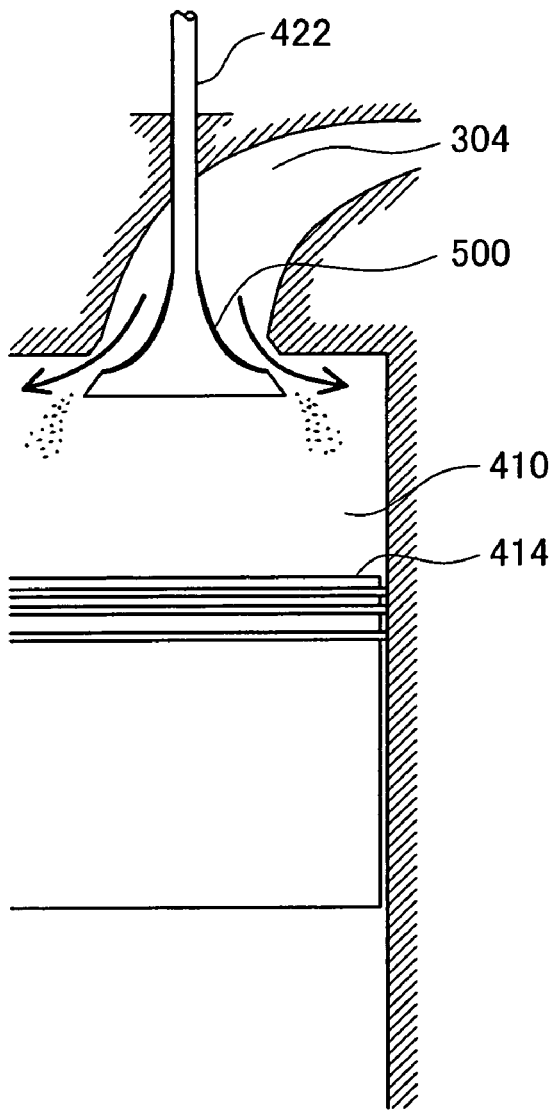

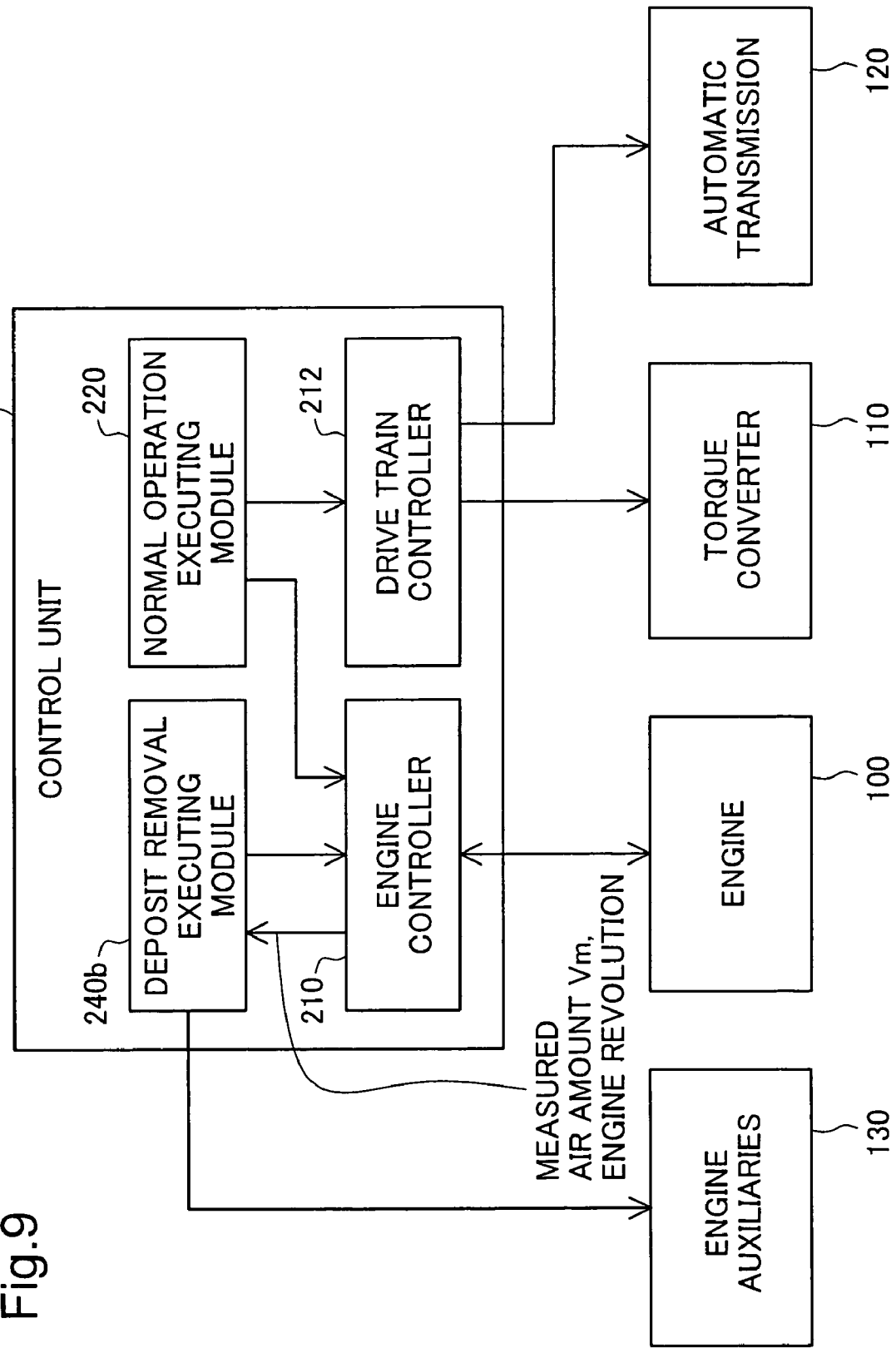

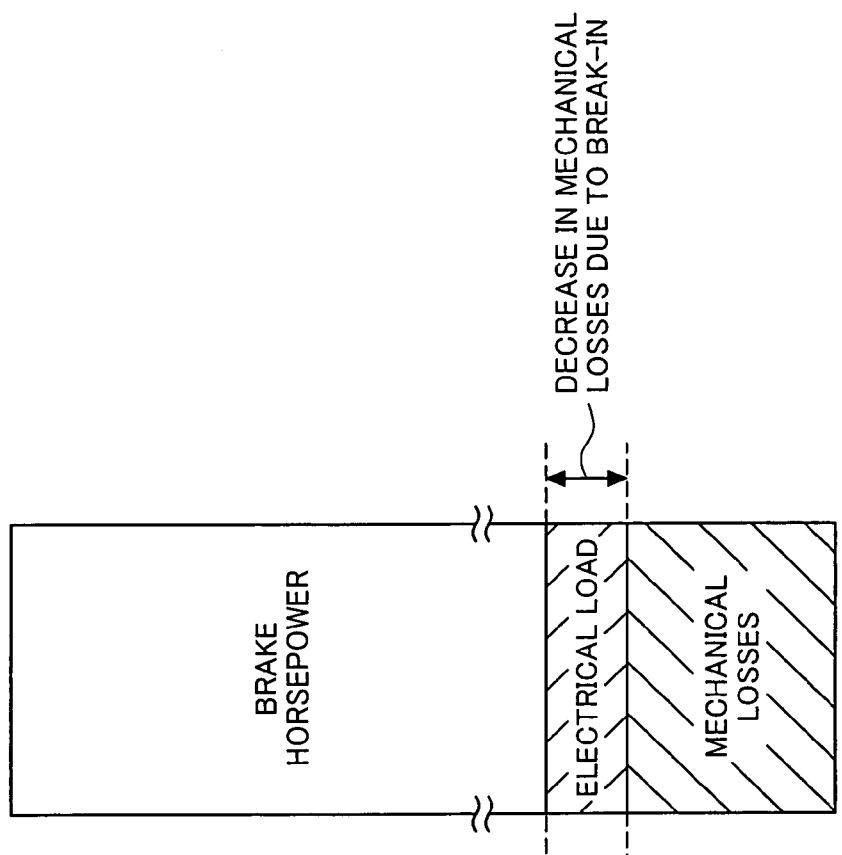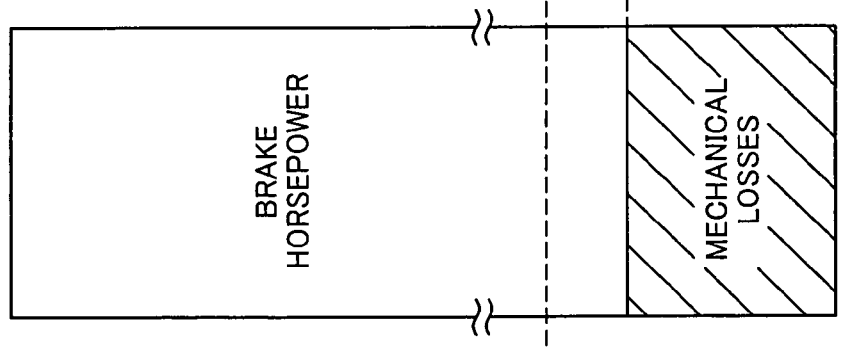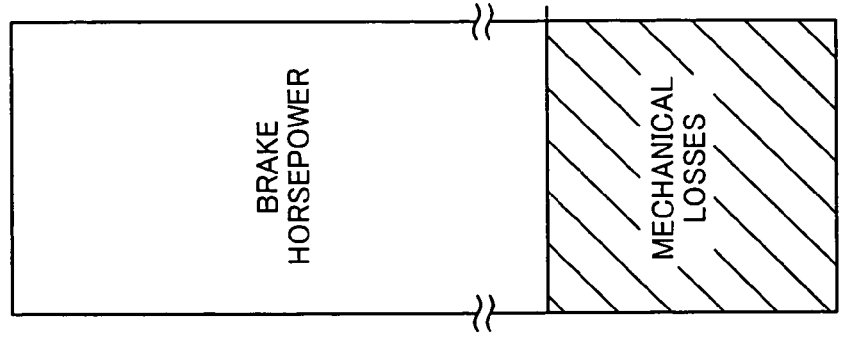

DEPOSIT REMOVAL FOR INTERNAL COMBUSTION ENGINE

BACKGROUND OF THE INVENTION

1. Field of the Invention

The present invention relates to a technique for removing deposits from an internal combustion engine, and in particular to a technique for removing deposits by means of controlling a variable valve mechanism.

2. Description of the Related Art

Deposits that accumulate in proximity to intake valves in internal combustion engines affect operation of the engine. Accordingly, removal of accumulated deposits or reducing accumulation of deposits has been standard practice. For example, JP1992-001404A discloses a technique that involves disposing a passage for directing intake air onto the head of the intake valve to reduce accumulation of deposits.

However, this technique entails adding a special device to the internal combustion engine, making the device more complicated overall.

SUMMARY OF THE INVENTION

An object of the present invention is to reduce accumulation of deposits without the need for any additional special device.

According to an aspect of the present invention, a control device for performing control of an internal combustion engine comprises: a variable valve mechanism configured to variably set opening timing of a intake valve of the internal combustion engine; and a deposit removal executing section configured to execute a deposit removal operation by controlling the variable valve mechanism to increase velocity of intake air into cylinders of the internal combustion engine, thereby removing deposits adhering in proximity to the intake valve.

According to this arrangement, the velocity of intake air into the cylinders of the internal combustion engine increases. As a result, accumulation of the deposits adhering in proximity to the intake valve can be reduced.

According to another aspect of the invention, there is provided a vehicle control apparatus for a vehicle including an internal combustion engine, an automatic transmission, and a control device including a variable valve mechanism, and a deposit removal executing section. The deposit removal executing section performs control of the automatic transmission during the deposit removal operation, to increase revolution of the internal combustion engine.

Higher engine revolution increases intake air flow. As a result, accumulation of the deposits adhering in proximity to the intake valve can be reduced.

The deposit removal executing section may perform the deposit removal operation during idling or during deceleration of the vehicle.

According to this arrangement, the deposit removal operation will not affect handling of the vehicle.

It should be noted that the present invention may be realized in varies ways. For example, the present invention may be realized as a controlling device and controlling method of an internal combustion engine, a vehicle comprising the controlling device, a computer program for implementing the functions of the controlling device or the controlling method, a computer readable medium for storing this computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 3(a) and 3(b) illustrate modeling deposit removal in the embodiment.

FIG. 9 is a block diagram showing the arrangement of a control unit 200b in a third embodiment.

FIGS. 10(a)–10(c) illustrate the rise in brake horsepower occurring with a decline in mechanical losses under a given set of operating conditions.

DESCRIPTION OF THE PREFERRED EMBODIMENT

Embodiments of the present invention will now be described in the following sequence.

Figure 1:
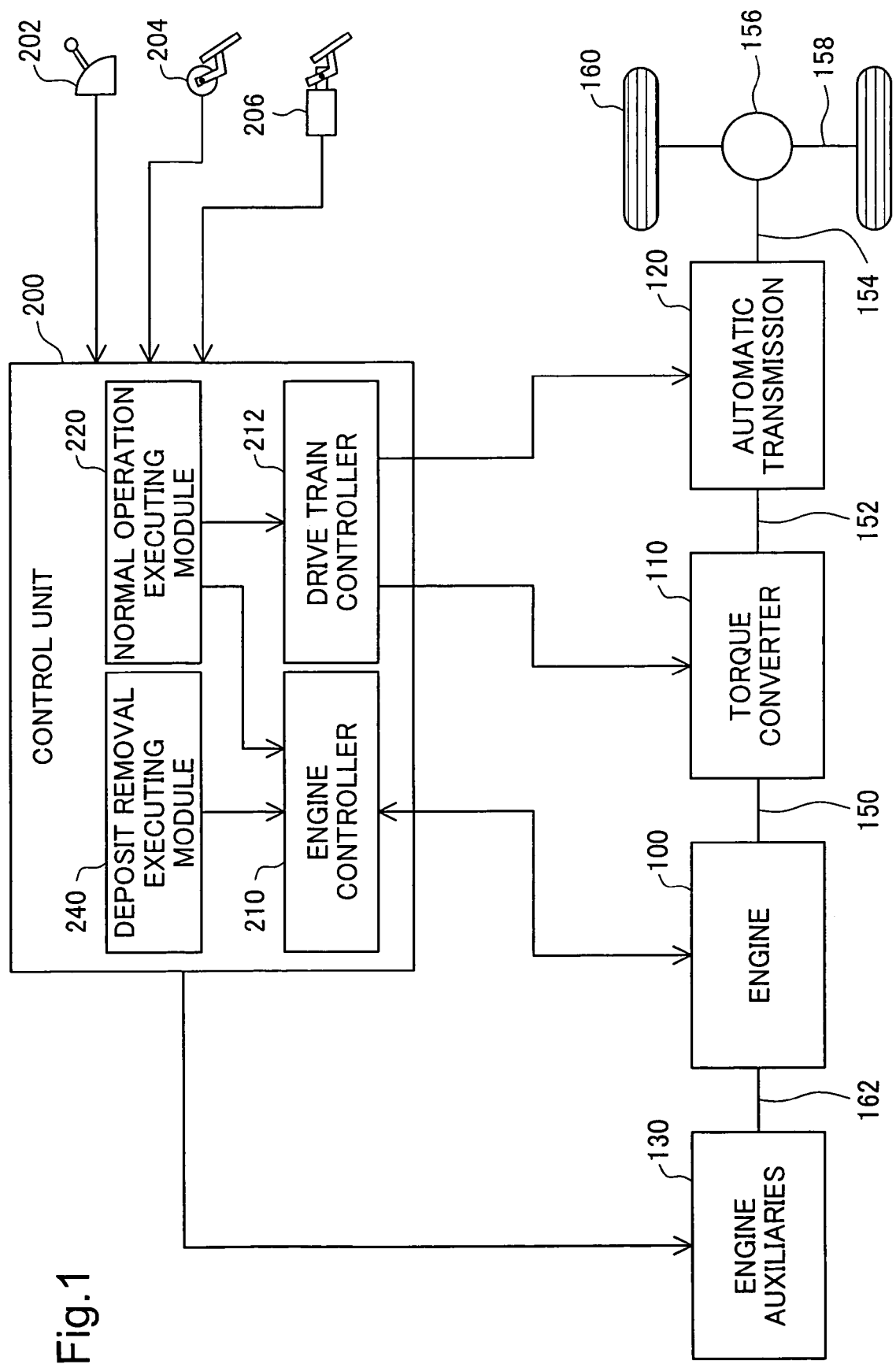
FIG. 1 is a schematic illustration of an automobile as an embodiment of the invention.

A. First Embodiment:

B. Second Embodiment:

C. Third Embodiment:

D. Fourth Embodiment:

E. Modifications:

A. First Embodiment:

FIG. 1 is a schematic illustration of an automobile as an embodiment of the invention. The wheel drive mechanism of this automobile (hereinafter termed simply a "vehicle") comprises an engine 100, a torque converter 110, and an automatic transmission 120. Engine 100 is linked to torque converter 110 via a first rotating shaft 150. Torque converter 110 is linked to automatic transmission 120 via a first drive shaft 152. Automatic transmission 120 is linked to wheels 160 via a second drive shaft 154, a differential gear 156, and an axle 158. In this way, rotation of engine 100 is transmitted to wheels 160. Engine auxiliaries 130 as a load on the engine 100 are linked to a second rotating shaft 162 of engine 100. Engine auxiliaries 130 include an air conditioner compressor, alternator, and other auxiliaries. Load on the engine during idling can vary depending on the operating status of these auxiliaries.

A control unit 200 controls the components of the vehicle on the basis of driver commands input using the shift lever 202, accelerator pedal 204, and brake pedal 206, as well as outputs of a number of sensors disposed at a number of locations on the vehicle. The control unit 200 comprises an engine controller 210, drive train controller 212, normal operation executing module 220, and deposit removal executing module 240. The normal operation executing module 220, which functions during normal operation, sends appropriate instructions to the engine controller 210 and drive train controller 212 in order to control operating status of the vehicle. In accordance with instructions from the normal operation executing module 220, engine controller 210 controls the engine 100 and drive train controller 212 controls the torque converter 110 and automatic transmission 120. During removal of deposits, on the other hand, the deposit removal executing module 240 sends instructions to engine controller 210 in order to control operating status of the engine 100.

Control of the vehicle by control unit 200 is realized by means of execution of computer programs installed in the control unit 200, or stored in memory. This program may provide on any of various media such as a ROM or hard disk in control unit 200. Alternatively, control unit 200 may be provided with a plurality of rewriteable memories, so that data of various kinds can be written to memory, or data can be read out from memory.

Figure 2:
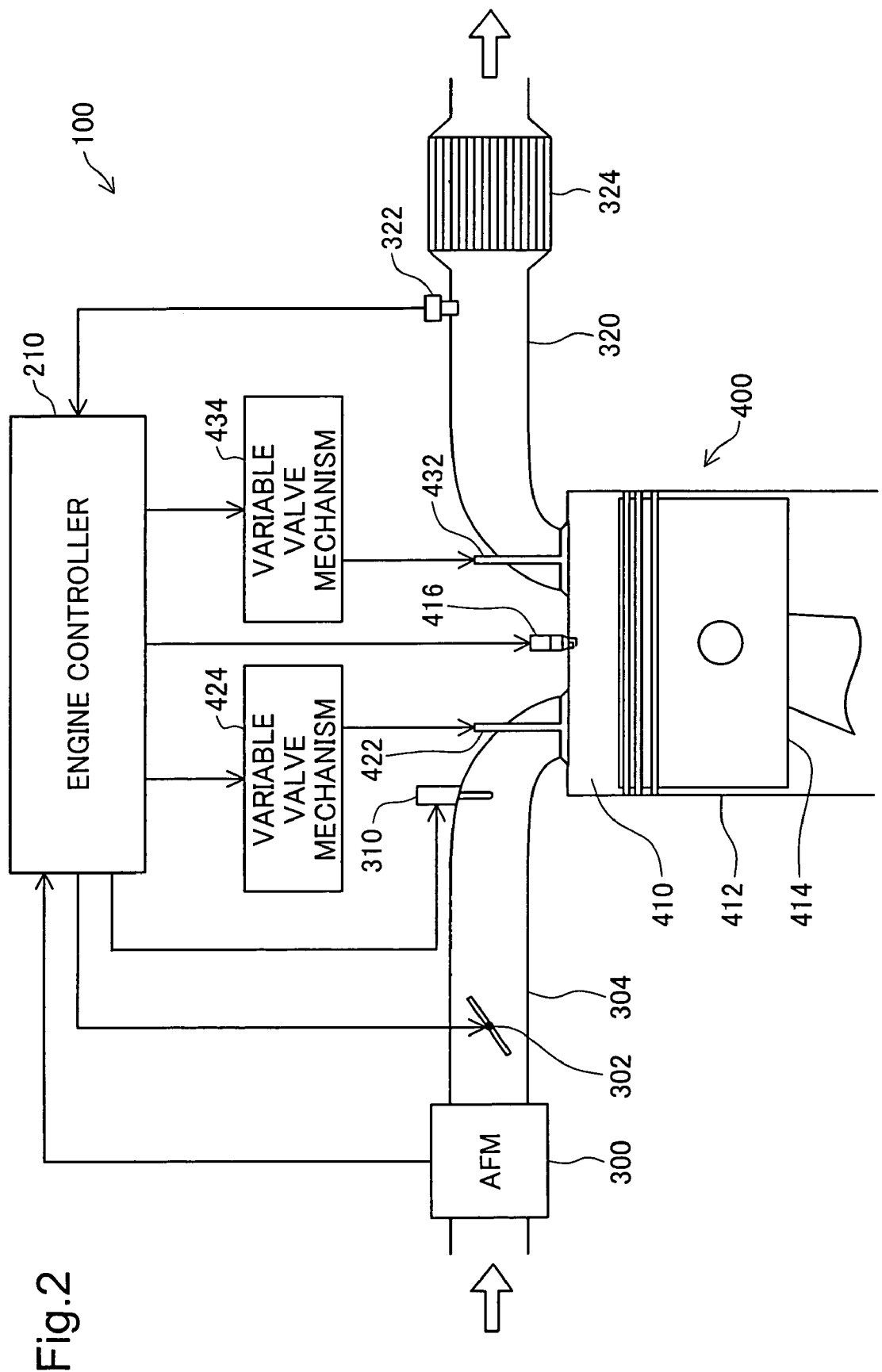
FIG. 2 is a conceptual illustration showing the arrangement of engine 100 in the embodiment.

FIG. 2 is a conceptual illustration showing the arrangement of engine 100 in the embodiment. This engine 100 comprises an engine body 400, an intake pipe 304 for supplying air to an engine body 400, and an exhaust pipe 320 for discharging exhaust from the engine body 400. The intake pipe 304 and exhaust pipe 320 split into a number of branch lines connected to a plurality of combustion chambers; in FIG. 2 however, illustration has been simplified to show only one branch line.

Along intake pipe 304 are disposed, in order from the upstream end, an air flow meter 300, a throttle valve 302 for controlling intake air amount, and a fuel injection device 310. The air flow meter 300 measures the intake air into the engine body 400, and presents the measurement to engine controller 210. Throttle valve 302 changes its opening in accordance with instructions from engine controller 210. In this way, intake air amount to engine body 400 is set to an appropriate target value. On exhaust pipe 320 are disposed an air-fuel ratio sensor 322 and a ternary catalyst 324 for removing harmful substances from the exhaust. In this embodiment, air flow meter 300 is disposed near the upstream end of intake pipe 304, but it would be possible to instead situate the air flow meter 300 at some other location on intake pipe 304. Also, whereas in this embodiment the fuel injection device 310 is disposed near the downstream end of intake pipe 304 to intake the air-fuel mixture into engine body 400, the fuel could instead be injected directly into the combustion chamber; or the fuel injection device 310 could be disposed at some other location on intake pipe 304.

Engine body 400 comprises a cylinder 412 and piston 414, with the gap between the cylinder 412 and piston 414 forming a combustion chamber 410. The air-fuel mixture is drawn into combustion chamber 414 from intake pipe 304. The air-fuel mixture that has been drawn in is then ignited by a spark plug 416, and combusts. The timing for ignition is determined by engine controller 210, according to instructions from the normal operation executing module 220 or deposit removal executing module 240, and sensor outputs from various parts of the engine. After combustion, the exhaust gases are discharged from combustion chamber 410 via the exhaust pipe 320.

Air intake and exhaust operations of engine body 400 are carried out by means of opening and closing an intake valve 422 and an exhaust valve 432. Intake valve 422 and exhaust valve 432 are each provided with a variable valve mechanism 424, 434. By controlling variable valve mechanisms 424, 434, engine controller 210 adjusts the opening timing and valve lift of the intake valve 422 and an exhaust valve 432. As a variable valve mechanism of this kind, there may be employed, for example, the arrangement disclosed in JP2001-263015A. Alternatively, variable valve mechanisms employing electromagnetic valves could be used.

While the variable valve mechanisms 424, 434 of this embodiment are valve mechanisms with variable lift, implementation in an internal combustion engine having non-variable valve lift is possible as well. However, where valve lift is small, variation of intake air amount due to deposits is significant. Accordingly, the need to remove deposits is higher in an internal combustion engine having variable valve mechanisms with variable valve lift, as opposed to one with non-variable valve lift.

FIGS. 3(*a*) and 3(*b*) illustrate modeling deposit removal in the embodiment. FIG. 3(*a*) and FIG. 3(*b*) each show status during intake valve 422 opening timing. In FIG. 3(*a*) and FIG. 3(*b*), throttle valve 304 is adjusted so that the intake air amount per single cycle is equal.

In the normal operating status shown in FIG. 3(*a*), the opening timing for intake valve 422 is set in proximity to top dead center. Since the closing timing for exhaust valve 432 is also in proximity to top dead center, pressure in combustion chamber 410 at intake valve 422 opening timing is substantially the same as the pressure in combustion chamber 410 at exhaust valve 432 closing timing, which is at about atmospheric pressure. Thus, both the combustion chamber 410 and intake pipe 304 are at approximately atmospheric pressure. Since the pressure difference between intake pipe 304 and combustion chamber 410 is small, flow velocity of intake air is far below the speed of sound, so deposits 500 adhering in proximity to intake valve 422 is not removed.

On the other hand, during the deposit removal operation shown in FIG. 3(*b*), opening timing for intake valve 422 is retarded, as compared to timing during the normal operation described above. Since, at this opening timing for intake valve 422, the cylinder 414 is at a position below top dead center, the volume of the combustion chamber 410 is larger than the volume of combustion chamber 410 at the exhaust valve 432 closing timing. Thus, pressure in combustion chamber 410 at intake valve 422 opening timing is lower than combustion chamber pressure at exhaust valve 432 closing timing, resulting in a large pressure difference between intake pipe 304 and combustion chamber 410. This large pressure difference between intake pipe 304 and combustion chamber 410 results in velocity of intake air generating a shock wave that exceeds the speed of sound, thereby dislodging deposits 500 from the intake valve 422 and surrounding parts.

Deposits 500 adhering in proximity to intake valve 422 are dislodged in the above-described manner, by increasing flow velocity of the intake air. Thus, it is sufficient to increase amount of intake air velocity in order to remove deposits. A similar effect could also be obtained, for example, by smaller valve lift of intake valve 422. At this time, by increasing the opening of the throttle valve 304 as well as reducing valve lift, the pressure difference between the cylinder interior and intake pipe interior can be increased even further, making it possible to increase amount of intake air velocity even further. Deposits 500 are dislodged from the intake valve 422 and surrounding parts by the high velocity intake air, thereby sufficiently reducing the deposits 500.

Figure 4:
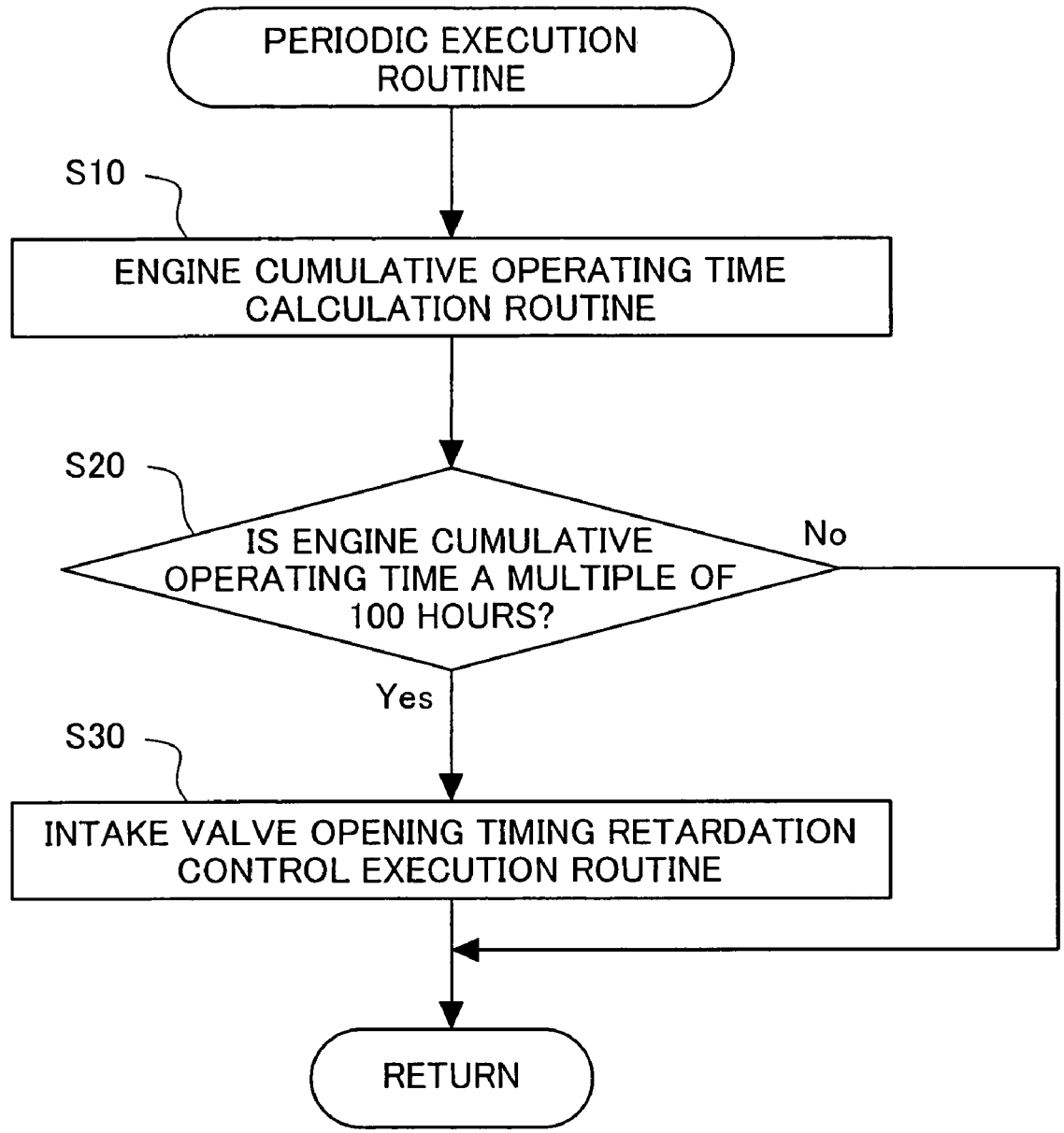
FIG. 4 is a flowchart of a deposit removal operation execution routine.

FIG. 4 is a flowchart of a deposit removal operation execution routine. This routine is executed repeatedly at given time intervals. In this embodiment, the deposit removal operation execution routine is initiated at given time intervals; however, an arrangement wherein the routine is executed at least one time within a predetermined time interval, for example, once every predetermined number of cycles, or in which it is executed each time that a predetermined distance is traveled, would be acceptable as well.

In step S10, deposit removal executing module 240 reads out engine cumulative operating time at the outset of the execution routine of the preceding deposit removal operation, which has been stored in memory (hereinafter termed simply "previous execution time"). A new value for engine cumulative operating time is then calculated from the read out value for engine cumulative operating time, and elapsed time since the previous execution time. Next, the deposit removal executing module 240 stores in memory the calculated cumulative operating time. In this embodiment, calculation of cumulative engine operating time is carried out in step S10; however, it would be possible instead to acquire the current value for cumulative operating time, for example, by reading out the value of a cumulative operating timer outside the control unit 200.

Next, in step S20, deposit removal executing module 240 decides, on the basis of the current value of cumulative operating time acquired in step S10, whether there is a need to remove deposits. Specifically, from the current value for cumulative operating time it decides whether a period of time, sufficient for deposits that could affect air intake to occur, has elapsed since the previous execution time (in the first embodiment 100 hours), in order to decide whether deposit removal is necessary. In the event that predetermined operating time has not yet elapsed since the previous execution time, it is decided that deposit removal is unnecessary, and the routine of FIG. 4 terminates.

In step S20, in the event of a decision that deposit removal is necessary, a deposit removal operation is executed in step S30. Specifically, the deposit removal executing module 240 instructs the engine controller 210 to retard the intake valve opening timing. Thereupon, the engine controller 210 controls the variable valve mechanism 424 in order to retard the opening timing of the intake valve 422, to remove deposits 500 in the manner described previously.

By controlling engine 100 in the manner described above, it is possible to reduce accumulation of deposits in proximity to intake valves. Thus, the accuracy of control of intake air amount by air flow meter 300 and air-fuel ratio sensor 322 can be improved, making it possible to readily remove harmful substances present in exhaust. Additionally, the deposit removal attains uniform air intake for the plurality of cylinders of the engine 100, thereby decreasing the occurrence of torque fluctuations.

B. Second Embodiment:

In the first embodiment, there was described an example in which deposit removal is executed at predetermined intervals; in a second embodiment, deposit removal is executed each time that the amount of accumulated deposits exceeds a predetermined amount.

Figure 5:
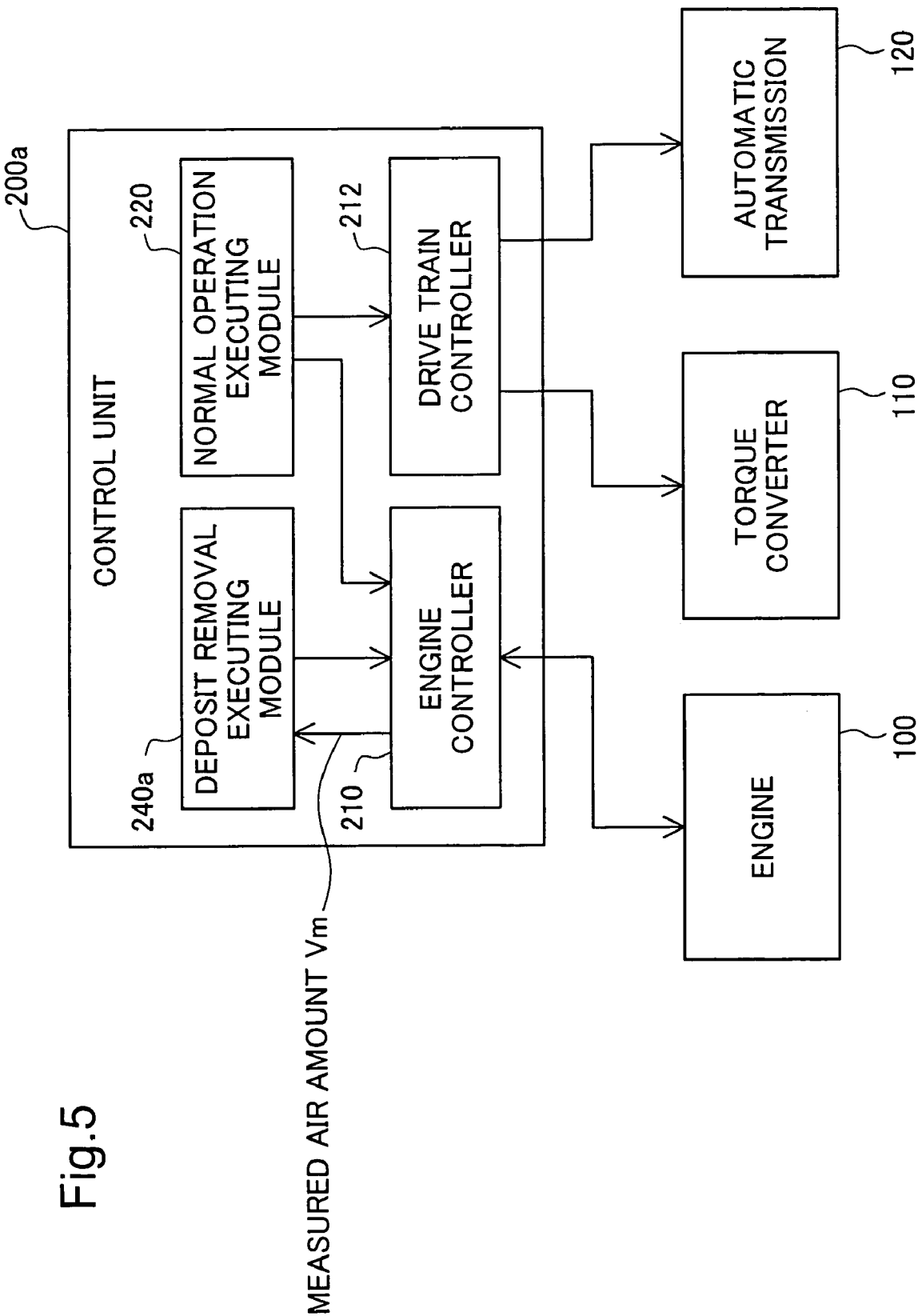
FIG. 5 is a block diagram showing the arrangement of a control unit 200a in the second embodiment.

FIG. 5 is a block diagram showing the arrangement of a control unit 200a in the second embodiment. A point of difference from the first embodiment shown in FIG. 1 is that deposit removal executing module 240a is presented by engine controller 210 with a measurement of intake air amount (hereinafter termed "measured air amount") Vm.

The measured air amount Vm presented by engine controller 210 to deposit removal executing module 240 can be measured by a number of methods. That is, besides being measured directly by air flow meter 300 disposed in intake pipe 304 of engine 100, it could instead be measured from the amount of fuel supplied by fuel injection device 310, and the output value of air-fuel ratio sensor 322. Calculations, based on a suitable model, from measurements made by these several methods are also possible.

Figure 6:
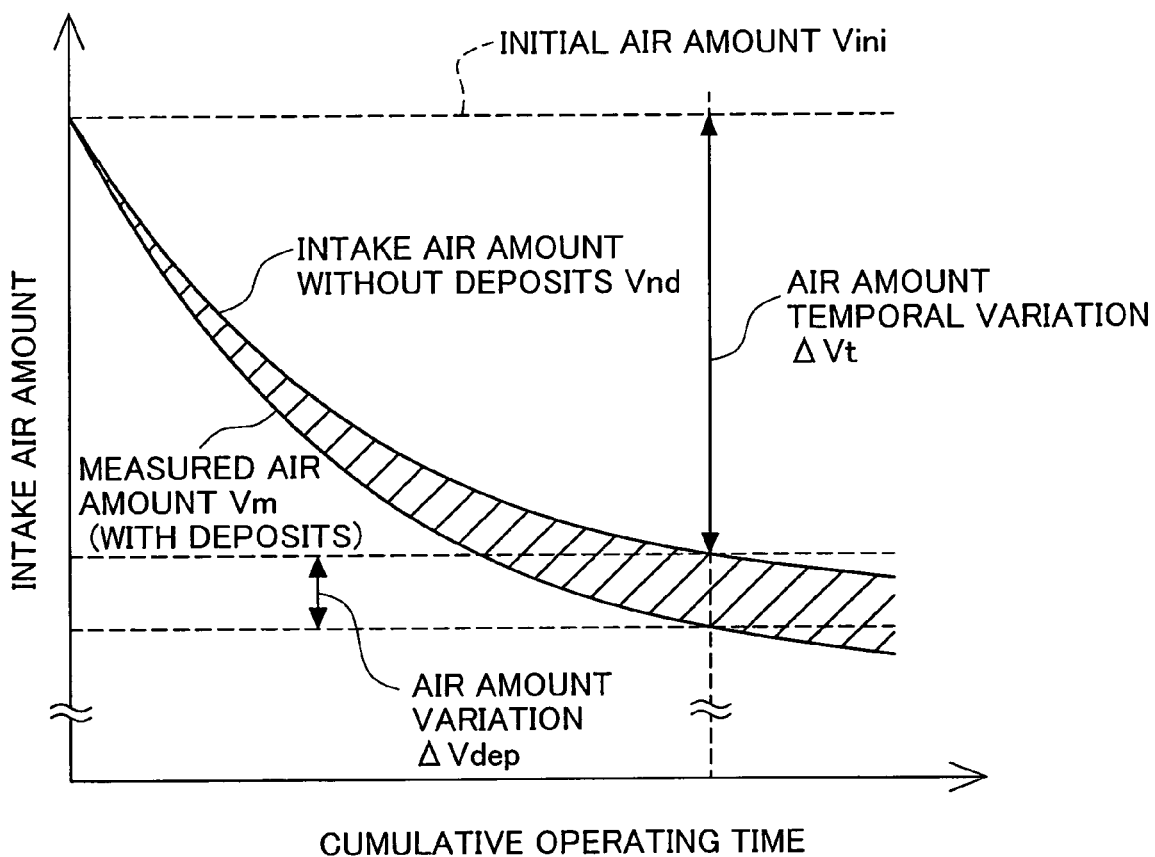
FIG. 6 illustrates temporal variation of intake air amount, at constant brake horsepower.

FIG. 6 illustrates temporal variation of intake air amount, at constant brake horsepower. The line at the upper edge of the hatched section in FIG. 6 represents change over time in intake air amount Vnd in the absence of deposits; the line at the lower edge of the hatched section represents change over time in the measured air amount Vm. Even where deposits are absent, as mechanical losses decline, intake air amount decline with time from its initial air amount Vini (refers to intake air amount at the outset of engine use). The reason is that due to the break-in effect, mechanical losses in an engine decline with time after initial use of the engine. Thus, where brake horsepower of an engine is a constant value, intake air amount will decline with time, even in the absence of deposits. The deposit-induced air amount variation $\Delta Vdep$ (shown hatched in the drawing), which is the difference between measured air amount Vm and intake air amount in the absence of deposits Vnd, increases as the amount of deposits increases.

The intake air amount of the engine that deposit removal executing module 240a uses to decide whether deposit removal is needed depends upon engine output and other such engine operating conditions. Thus, when measuring intake air amount, deposit removal executing module 240a instructs engine controller 210 to set the engine 100 in a predetermined operating condition. Specifically, engine 100 is controlled such that engine brake horsepower reaches a predetermined value. FIG. 6 shows characteristics when brake horsepower is constant in this predetermined operating condition.

In this way, intake air amount at constant brake horsepower decreases over time, irrespective of whether deposits are present. On the other hand, the variation of intake air amount with time as mechanical losses decline (hereinafter termed simply "air amount temporal variation") $\Delta Vt$ ($=Vini-Vnd$) is substantially independent of past engine operating status, being determined by cumulative operating time of the engine. Accordingly, the deposit-induced air amount variation $\Delta Vdep$ ($=Vm-Vnd$) can be estimated from the air amount temporal variation $\Delta Vt$, measured air amount Vm, and initial amount of air Vini stored in memory.

The air amount variation $\Delta Vdep$, which is the difference between measured air amount Vm and intake air amount in the absence of deposits Vnd ($=Vini-\Delta Vt$), is estimated by the deposit removal executing module 240a. The deposit removal executing module 240a then executes deposit removal when the estimated air amount variation $\Delta Vdep$ goes above a predetermined value.

Figure 7:
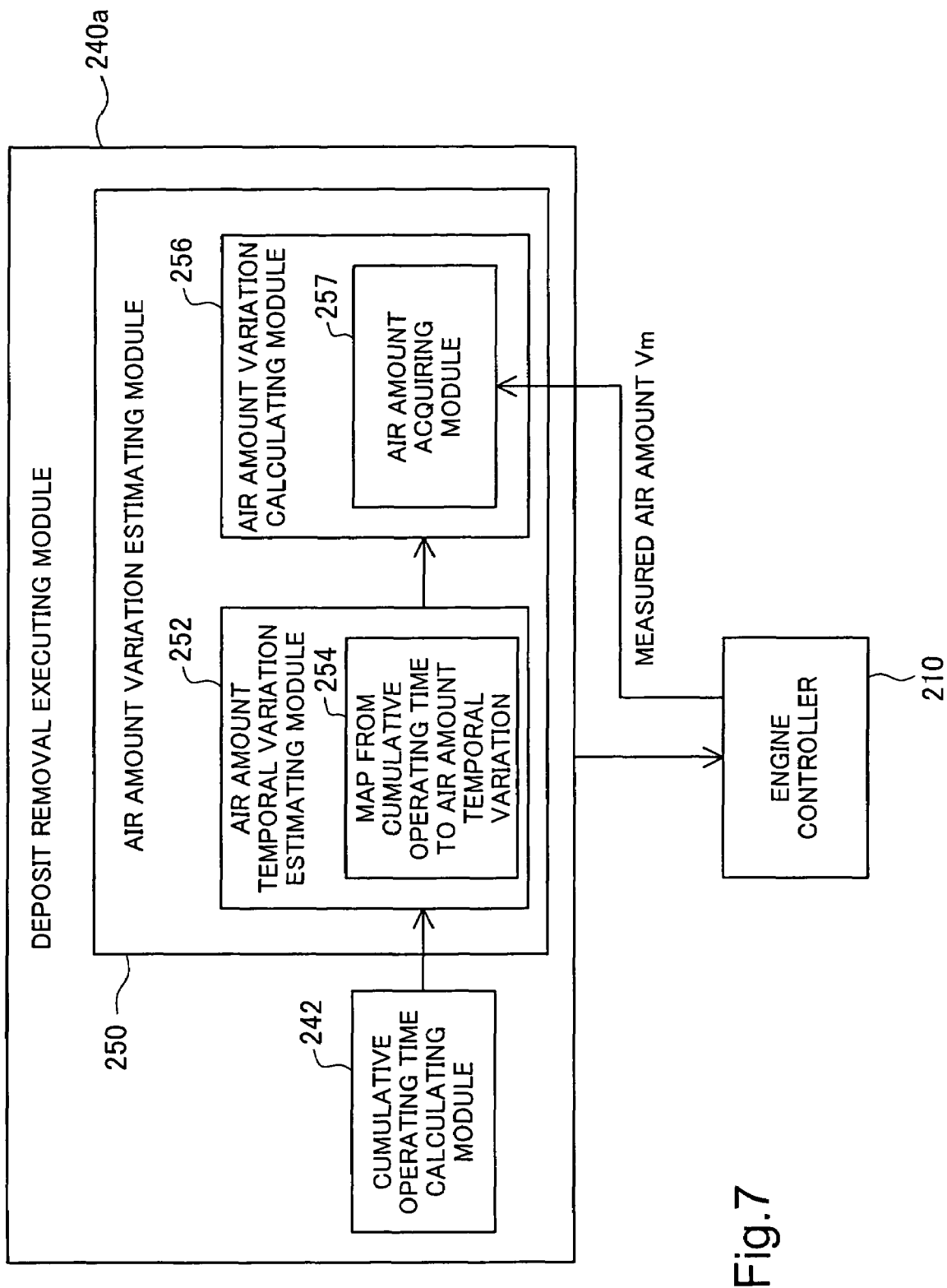
FIG. 7 is a block diagram showing the arrangement of deposit removal executing module 240a in the second embodiment.

FIG. 7 is a block diagram showing the arrangement of deposit removal executing module 240a in the second embodiment. Deposit removal executing module 240a comprises a cumulative operating time calculating module 242 and an air amount variation estimating module 250, which functions as the parameter acquiring module. The air amount variation estimating module 250 is equipped with an air amount temporal variation estimating module 252 for estimating air amount temporal variation $\Delta Vt$. The air amount temporal variation estimating module 252 comprises a map 254 for calculating air amount temporal variation $\Delta Vt$ from cumulative operating time of the engine. By making reference to map 254, air amount temporal variation estimating module 252 estimates temporal variation $\Delta Vt$ corresponding to a value for operating time, supplied by cumulative operating time calculating module 242.

An air amount variation calculating module 256 comprises an air amount acquiring module 257 for acquiring measured air amount Vm from the engine controller 210. On the basis of the temporal variation $\Delta Vt$ supplied by air amount temporal variation estimating module 252, air amount variation calculating module 256 corrects the initial amount of air Vini, which is the baseline value for intake air amount stored in memory. The air amount variation calculating module 256 then calculates the difference $\Delta Vdep$ (air amount variation) between this corrected intake air amount baseline value Vnd, and measured air amount Vm. In the event that air amount variation $\Delta Vdep$ calculated in this way reaches a predetermined value, deposit removal executing module 240a instructs the engine controller 210 so as to control the engine 100 to carry out deposit removal.

Figure 8:
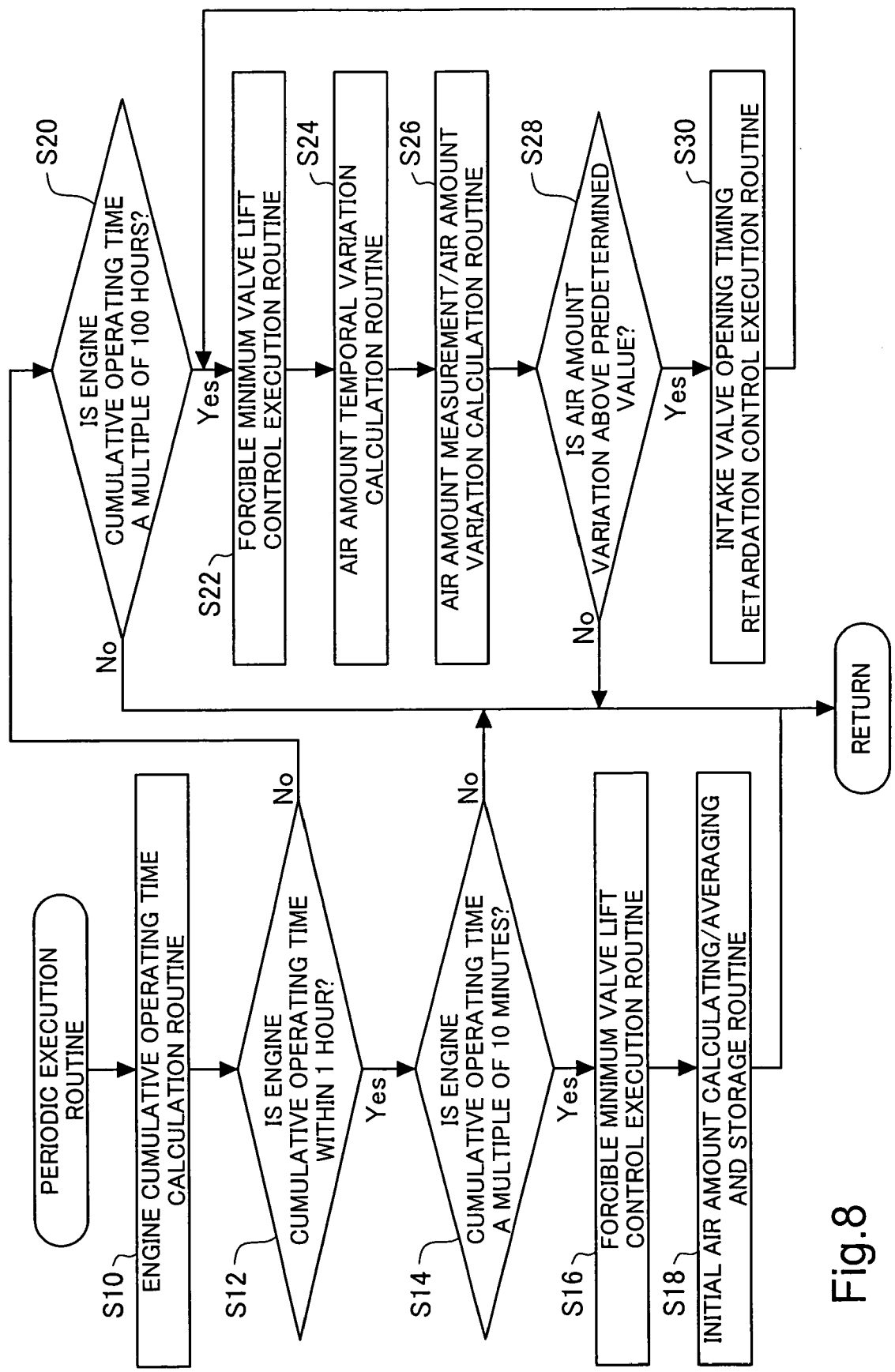
FIG. 8 is a flowchart of a deposit removal operation execution routine in the second embodiment.

FIG. 8 is a flowchart of a deposit removal operation execution routine in the second embodiment. As in the first embodiment, this routine is executed repeatedly at given time intervals. Also, as in the first embodiment, it may instead be executed at least once during a predetermined period of operation.

In step S10, deposit removal executing module 240a reads out cumulative operating time at the time of previous execution, which has been stored in memory. A new value for cumulative operating time of the engine 100 is then calculated from the read out value for engine cumulative operating time, and elapsed time since the previous execution. Next, the deposit removal executing module 240 stores in memory the calculated cumulative operating time.

Next, in step S12 deposit removal executing module 240 decides, from the cumulative operating time calculated in step S10, whether engine 100 is in a specific initial period of use. If the engine is not in the initial period of use, control proceeds to step S20 for deciding whether deposit removal is needed. In this embodiment, the initial period of use is set to be a cumulative operating time of up to one hour. This period may instead by any period over which the effects of deposits are negligible, for example, a period of time until cumulative number of rotations of engine 100 reaches a predetermined value, or the like.

In step S12, if the engine 100 is decided to be in the initial period of use, in step S14 a decision is made as to whether to measure intake air amount. The measurement of intake air amount is performed a plurality of times during the initial period of use, at predetermined time intervals (in the embodiment, every 10 minutes). Then, in step S14, if a decision is made not to measure intake air amount, the routine of FIG. 8 terminates. The interval for measurement of intake air amount may be any interval such that a plurality of intake air amount measurements can be made during the initial period of use. Measurements may be made at intervals different from those in this embodiment; or intake air amount may be measured at intervals of a predetermined number of cycles.

In the event that engine 100 is in the initial period of use, deposit removal executing module 240a also sends to engine controller 210 an instruction to minimize valve lift of intake valve 422 (step S16). Next, deposit removal executing module 240a acquires from engine controller 210 a measurement of intake air amount. An average value for intake air amount is calculated from the intake air amount measurement and the previous measurement which is stored in memory, and this is placed in memory as initial air amount Vini (step S18). After the process of step S18, the routine of FIG. 8 terminates.

In the second embodiment, valve lift of intake valve 422 at the time that intake air amount is measured is controlled to the minimum value at which deposits have significant effect on intake air amount; in general, measurement could be carried out in a state in which intake air amount is affected by deposits. For example, a predetermined state in which valve lift is not minimized would be acceptable, as would measurement of intake air amount at each of a plurality of valve lifts.

In the event that engine 100 is not in the initial period of use, deposit removal executing module 240a decides, from the current value of cumulative operating time acquired in step S10, whether deposit removal is needed (step S20). Specifically, from the current value of cumulative operating time, it decides whether a period of time sufficient for deposits that could affect air intake to occur has elapsed since the previous execution (in the the second embodiment 100 hours), in order to decide whether deposit removal is necessary. In the event that predetermined operating time has not yet elapsed since the previous execution, it is decided (without measuring intake air amount) that deposit removal is unnecessary, and the routine of FIG. 8 terminates.

In the second embodiment, the decision as to whether deposit removal is needed is made on the basis of cumulative operating time, but it would be possible also to omit performing the decision of step S20. That is, measurement of intake air amount may be carried out each time that the deposit removal operation execution routine is executed. However, since there are instances in which control status is not optimal for vehicle operation during measurement of intake air amount, in order to reduce the frequency of such instances, it is preferable to make decisions as to the need to measure intake air amount on the basis of cumulative operating time.

In the event of a decision in step S20 that measurement of intake air amount is needed, the deposit removal executing module 240a provides instruction to the engine controller 210 so as to control the engine 100 in order to minimize valve lift of the intake valve 422 (step S22). In this embodiment, control is carried out so as to minimize valve lift of the intake valve 422; for the purpose of comparison with the initial state, valve lift is typically controlled to a state identical to the state at the time of initial measurement of air amount (step S16).

Next, deposit removal executing module 240a calculates the air amount temporal variation $\Delta Vt$ (FIG. 6) from the current value for cumulative operating time acquired in step S10 (step S24). Calculation of the air amount temporal variation $\Delta Vt$ is carried out with reference to the map 254 of cumulative operating time and air amount temporal variation $\Delta Vt$, provided in control unit 200a. Then, using the measured air amount Vm supplied by the engine controller 210, the initial air amount Vini stored in memory, and the air amount temporal variation $\Delta Vt$ calculated in step S24, the deposit removal executing module 240a estimates the air amount variation $\Delta Vdep$ (step S26).

In step S28, a decision as to whether deposit removal is needed is made on the basis of air amount variation ΔVdep estimated in step S26. In the event that the estimated air amount variation ΔVdep is above a predetermined level, the decision is made that the amount of deposits exceeds the permissible range, and deposit removal is executed. In the event that deposit removal is unnecessary, the routine of FIG. 8 terminates, and normal operation control resumes.

In the event of a decision that deposit removal is necessary, deposit removal executing module 240a sends an instruction to the engine controller 210 to retard the opening timing of the intake valve 422. Once opening timing of the intake valve 422 has been retarded, deposits are removed in the manner described previously (step S30). Once the deposit removal of step S30 has been completed, control returns to step S22, and deposit removal is repeated until the decision is made in step S28 that deposit removal is unnecessary.

By means of control of the engine 100 in the manner described above, deposit removal is carried out as needed. Thus, since the second embodiment affords lower frequency of deposit removal operations at non-optimal times for engine operation than in the case of the first embodiment, it has an advantage over the first embodiment in terms of vehicle handling. On the other hand, control in the first embodiment is simpler than in the second embodiment, and it has an advantage over the second embodiment in that there is no need to measure intake air amount.

In the second embodiment, the difference between measured air amount Vm and a baseline value for intake air amount is employed as the parameter for deciding whether deposit removal is needed; however, any parameter relating to the amount of deposits could be used in deciding whether deposit removal is needed. For example, intake air velocity, intake pipe pressure, or some parameter derived from a suitable model of these parameters, could be used in deciding whether deposit removal is needed.

In the second embodiment, air amount at the outset of engine use Vini is used as the baseline value for intake air amount, but it would be acceptable instead to use intake air amount in the absence of adhering deposits as the baseline value for intake air amount. For example, intake air amount immediately following deposit removal or the like could be used as the baseline value for intake air amount.

C. Third Embodiment:

FIG. 9 is a block diagram showing the arrangement of a control unit 200b in a third embodiment. In contrast to the arrangement in the second embodiment, deposit removal executing module 240b is presented by engine controller 210 with a measurement of engine revolution, in addition to measured air amount Vm. Deposit removal executing module 240b provides instruction to engine auxiliaries 130 in order to control the status of the auxiliaries.

As in the second embodiment, deposit removal executing module 240b of the third embodiment provides instruction to engine controller 210 to place the engine 100 in a predetermined operating condition for measuring the air amount variation ΔVdep. This predetermined operating condition is, for example, a condition of constant load (such as that during idling) and is achieved by setting the throttle valve 302 opening and amount of fuel injected by the fuel injection device 310 to predetermined values. Here, since mechanical losses of engine 100 declines over time, engine brake horsepower and revolution rise, relative to the initial period of engine use.

FIGS. 10(a)–10(c) illustrate the rise in brake horsepower occurring with a decline in mechanical losses under a given set of operating conditions. FIG. 10(a) shows total output of an engine during the initial period of engine use, distributed between brake horsepower and mechanical losses. As shown in FIG. 10(b), after a predetermined period of time has elapsed, mechanical losses of the engine decline due to the breaking-in effect. On the other hand, since engine operating conditions are the same, total output of the engine is substantially unchanged between an initial point in time and after the predetermined period of time has elapsed. Thus, brake horsepower increases only to the extent that mechanical losses decline.

In order to compensate for the decline in mechanical losses, in the third embodiment, load imposed by electrical devices is added, making brake horsepower the same as that during initial period of use as shown in FIG. 10(c). Specifically, with the engine in a predetermined operating condition, load imposed by engine auxiliaries 130 increases when electrical devices are operated. During idling, engine revolution is the same as during initial period of use when this electrical load is imposed on the engine. At this time, since the external load during idling is substantially constant regardless of the passage of time, engine revolution is the same as in the initial period, and thus engine brake horsepower is equivalent to that in the initial state. In this embodiment, electrical load is applied, but instead mechanical load, such as that imposed by the compressor of an air conditioning system, could be imposed as well.

Figure 11:
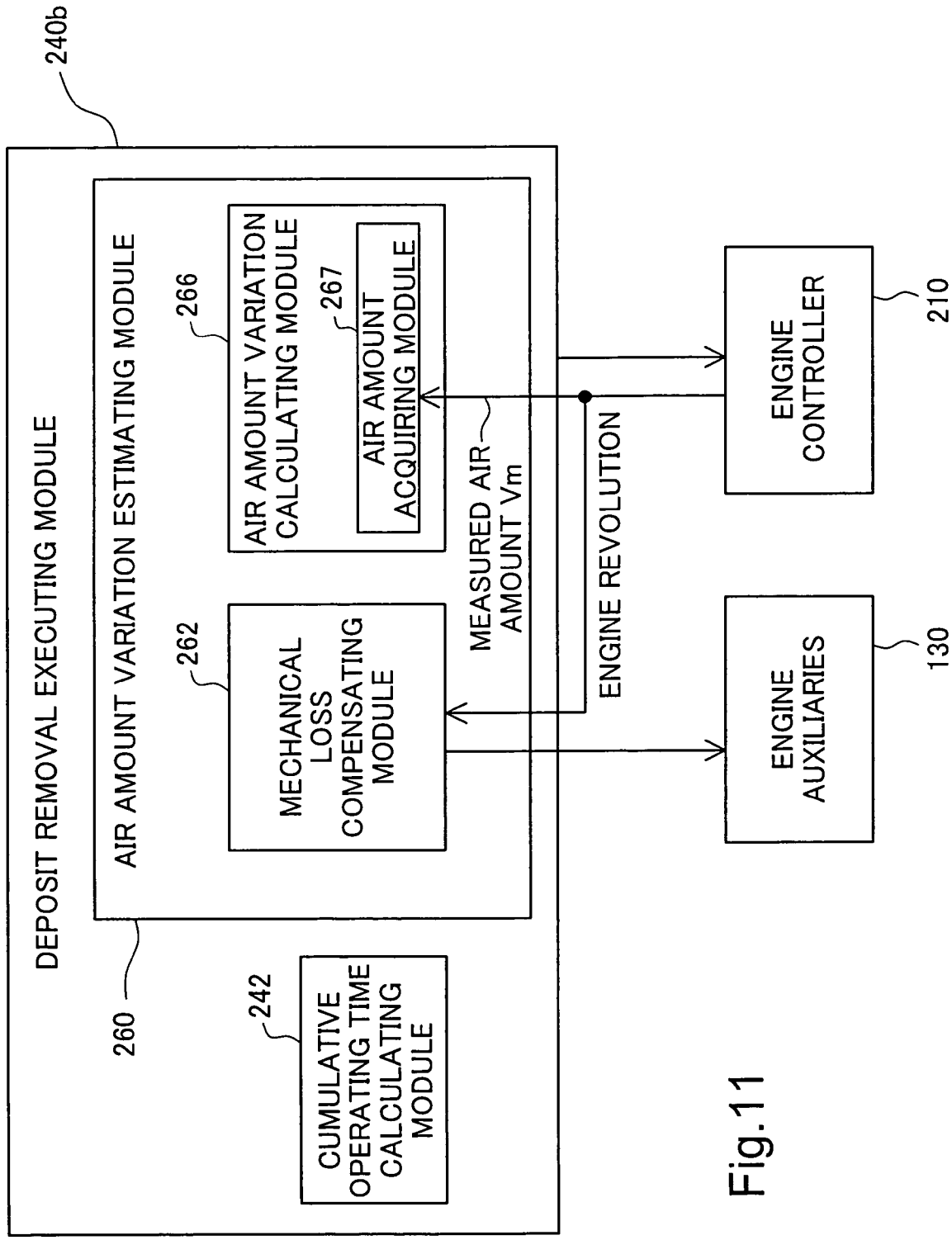
FIG. 11 is a block diagram showing the arrangement of the deposit removal executing module 240b in the third embodiment.

FIG. 11 is a block diagram showing the arrangement of the deposit removal executing module 240b in the third embodiment. Deposit removal executing module 240b comprises a cumulative operating time calculating module 242 and an air amount variation estimating module 260, functioning as the parameter acquiring module. The air amount variation estimating module 260 additionally comprises a mechanical loss compensating module 262 for compensating for the decline in mechanical losses in the engine, which functions as the compensating module for compensating for engine aging characteristics. The mechanical loss compensating module 262 controls the engine auxiliaries 130 on the basis of an engine revolution measurement supplied by engine controller 210, in order to increase the load on the engine. An intake air amount acquiring module 267 in an air amount variation calculating module 266 acquires from engine controller 210 the measured air amount Vm at predetermined engine speed. The air amount variation calculating module 266 then calculates the difference ΔVdep (air amount variation) between this measured air amount Vm and the baseline value for intake air amount, namely, initial amount of air Vini. In the event that the air amount variation ΔVdep has reached a predetermined value, deposit removal executing module 240b sends an instruction to engine controller 210 to carry out deposit removal, in the same manner as the second embodiment.

Figure 12:
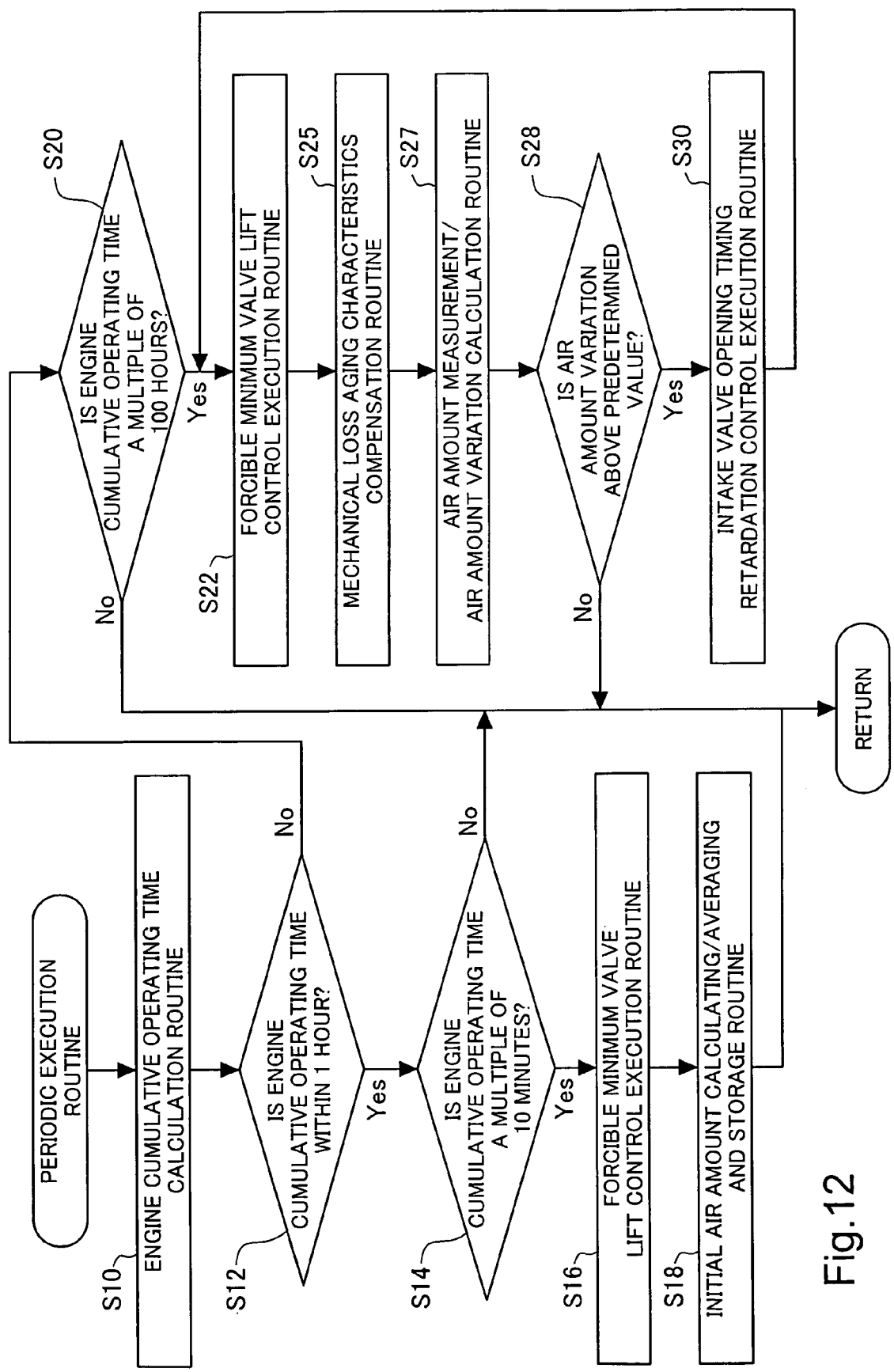
FIG. 12 is a flowchart of the execution routine for the deposit removal operation in the third embodiment.

FIG. 12 is a flowchart of the execution routine for the deposit removal operation in the third embodiment. In this flowchart, steps S24 and S26 in the second embodiment shown in FIG. 8 are replaced with steps S25 and S27, but is otherwise the same as the second embodiment. In step S25, the above-described compensation for mechanical losses is carried out, and in step S27 air amount variation ΔVdep is estimated from measured air amount Vm and initial amount of air Vini. As in the first and the second embodiments, this routine may be executed at least once within a predetermined period of operation.

In the case of the third embodiment as well, it is possible by means of the above-described control to remove deposits on an as-needed basis, to provide advantages similar to those of the second embodiment.

Also, whereas in the third embodiment load is applied to the engine in order to compensate for the decline in mechanical losses of the engine occurring due to the breaking-in effect, it is sufficient for the power loss at the time that measured air amount Vm is measured to be set substantially equal to that when the baseline value for air intake is measured. For example, engine mechanical losses that increase due to fluctuations in engine temperature or oil temperature, to deterioration of engine oil, or to other factors may be compensated for by increasing the load on the engine.

Figure 13:
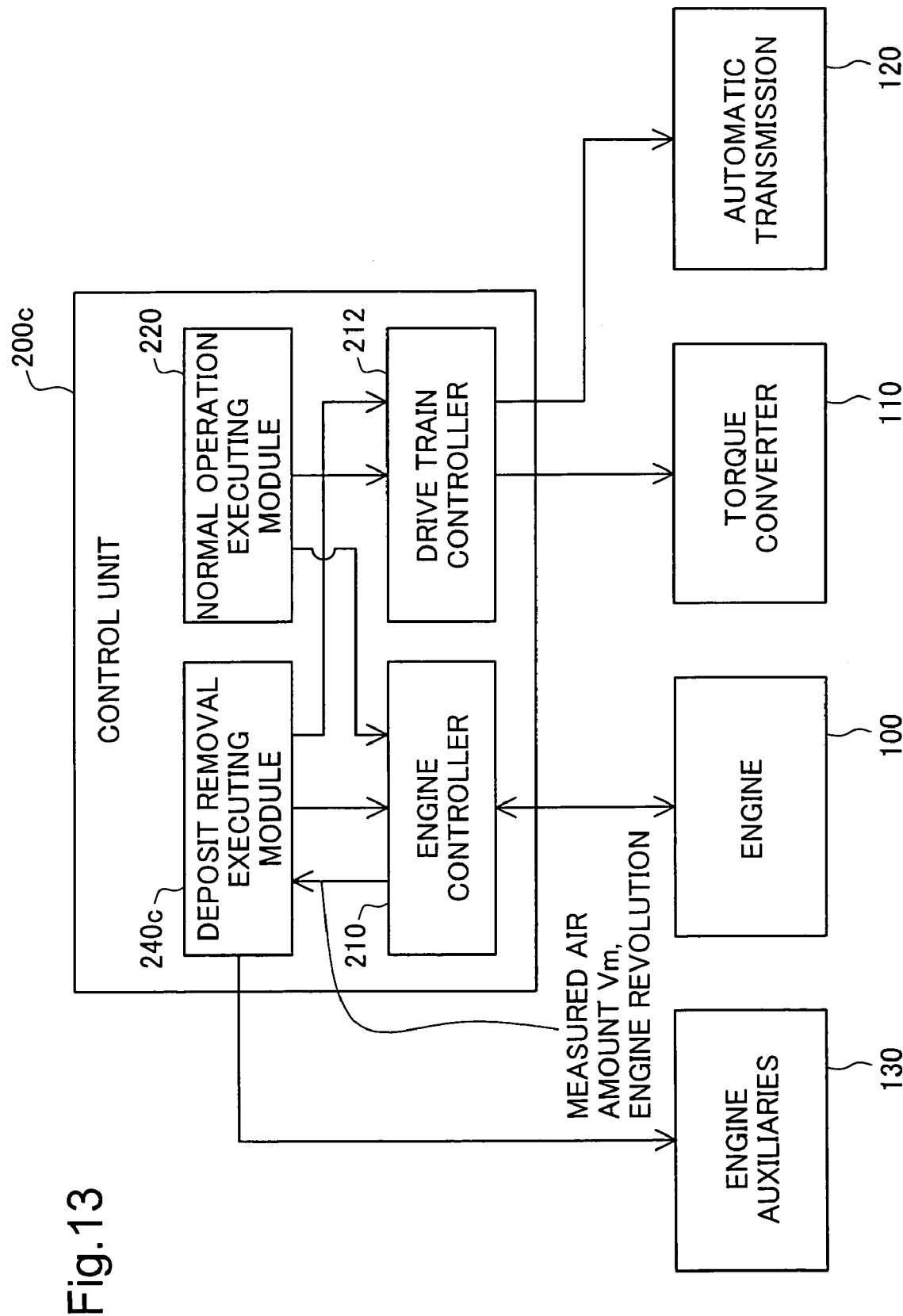
FIG. 13 is a block diagram showing the arrangement of the control unit 200c in a fourth embodiment.

D. Fourth Embodiment:

FIG. 13 is a block diagram showing the arrangement of the control unit 200c in a fourth embodiment. In contrast to the control unit 200b in the third embodiment of FIG. 9, the deposit removal executing module 240c provides instruction to a drive train controller 212.

The deposit removal executing module 240c of the fourth embodiment, when retarding the opening timing of the intake valve to execute deposit removal, raises the engine revolution to a level above the normal operating condition, while holding engine output substantially constant.

Figure 14:
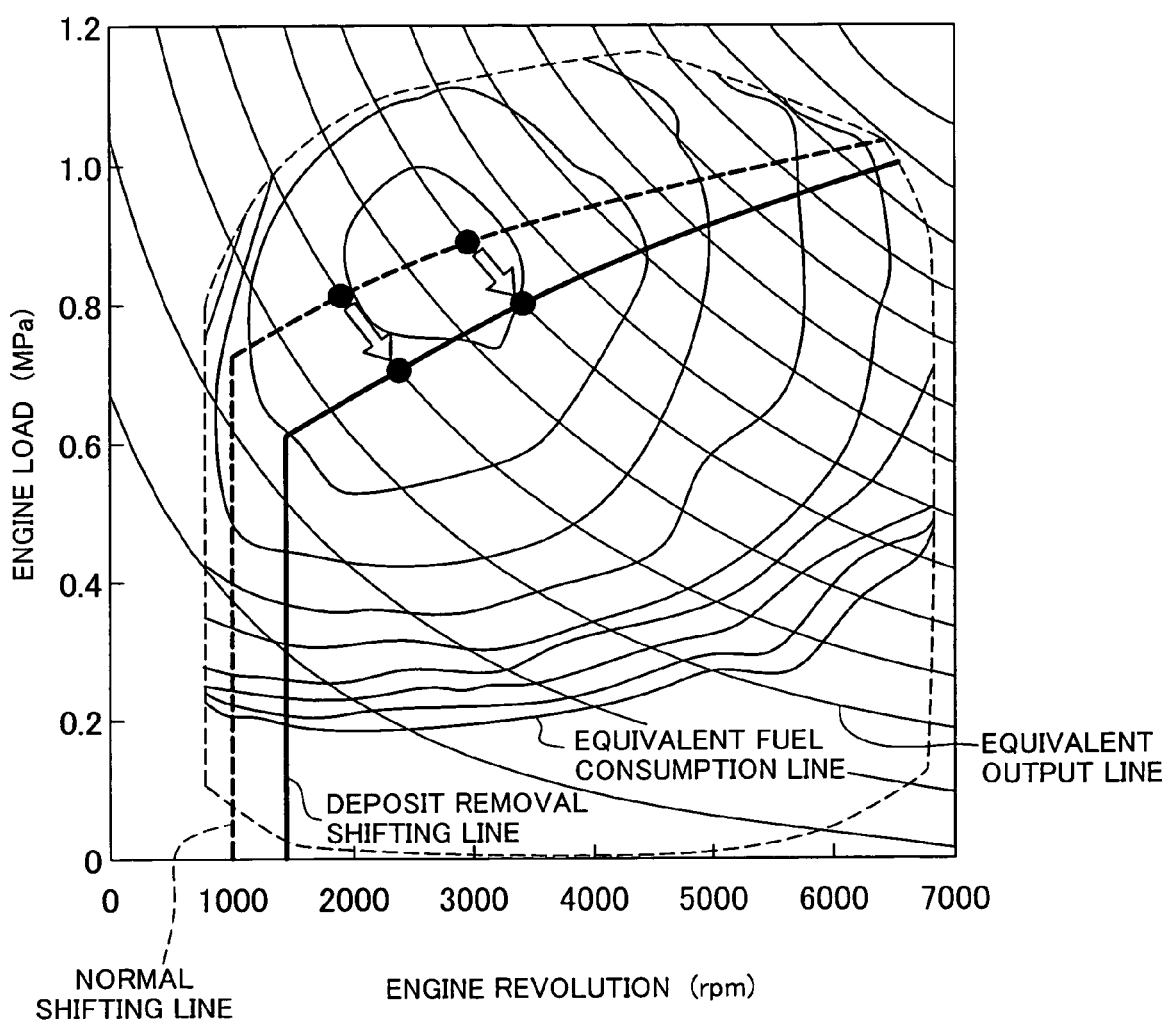
FIG. 14 is an illustration of shift control during deposit removal in the fourth embodiment.

FIG. 14 is an illustration of shift control or transmission control during deposit removal in the fourth embodiment. Under normal shift control, engine revolution and engine load are controlled to levels on the optimal fuel consumption line indicated by the broken line (normal shift line). Deposit removal executing module 240c moves engine revolution and engine load from the normal shift line along equivalent output lines onto the high speed/low load deposit removal shift line indicated by the solid line. In this way, output during deposit removal is made equivalent to that during normal operation. Since engine output is the same during execution of deposit removal operations and during normal operating status, good vehicle handling is maintained. Accordingly, deposit removal operations can be executed irrespective of vehicle driving conditions, to keep excessive deposits from accumulating.

In the deposit removal operation of the fourth embodiment, since piston speed rises with higher engine revolution, intake air flow speed rises as well. In this state, since the gear ratio is high, engine load torque drops. Since valve lift is small under conditions of low load torque operation, the flow channel area in proximity to the intake valve is small, making the flow speed in proximity to the intake valve even higher. The higher intake air flow speed promotes removal of deposits.

Figure 15:
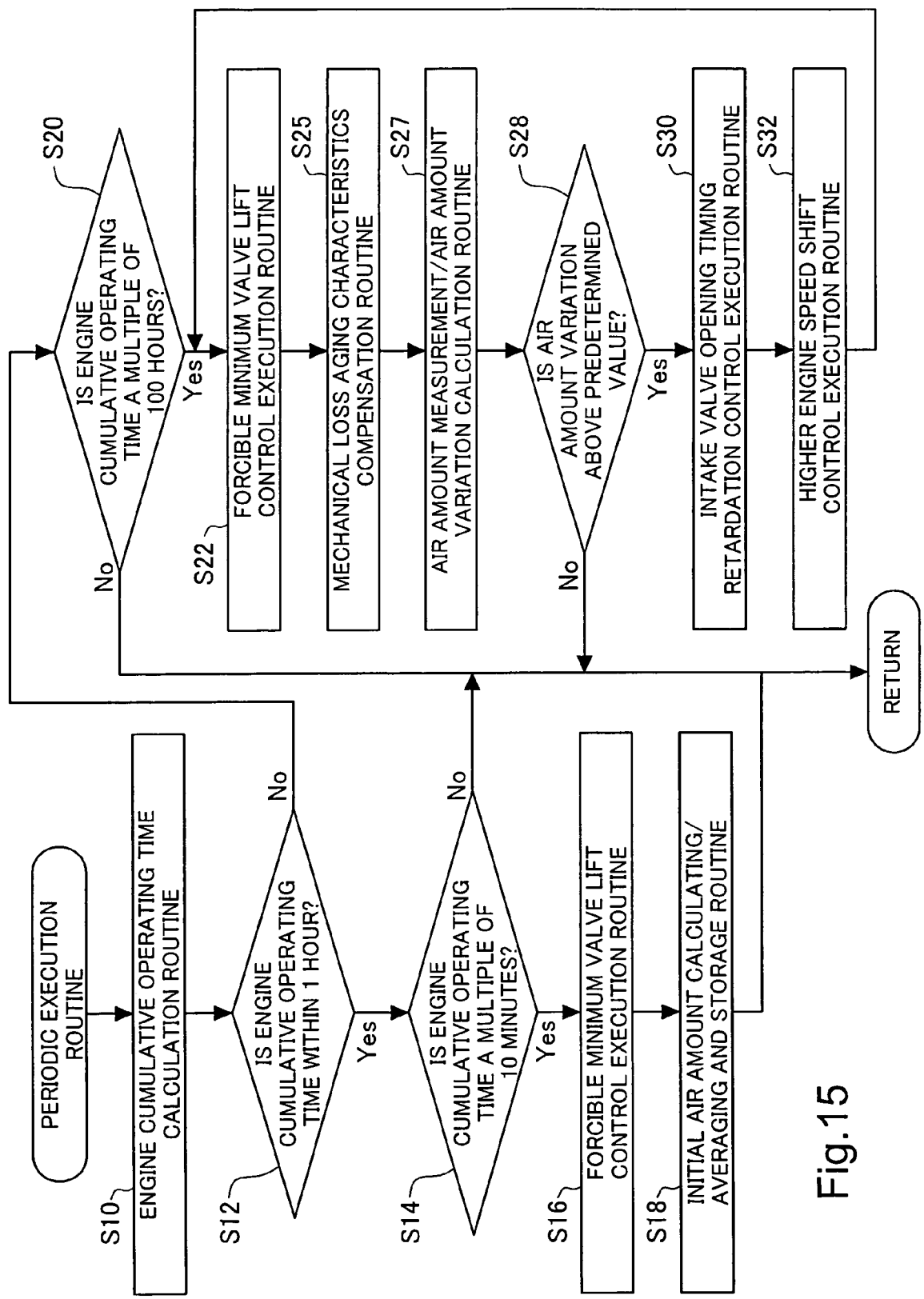
FIG. 15 is a flowchart of the execution routine for the deposit removal operation in the fourth embodiment.

FIG. 15 is a flowchart of the execution routine for the deposit removal operation in the fourth embodiment. In this execution routine, a shift control execution routine (step S32) is added to the execution routine for deposit removal in the third embodiment of FIG. 12. In step S32, engine revolution and engine load are controlled to levels on the deposit removal shift line described above, to maintain engine output at a given level even during deposit removal.

Although a stepped automatic transmission may be used as the automatic transmission 120, a continuously variable automatic transmission is preferred, for its ability to control shifting onto any shift line.

In the fourth embodiment, shift control to a deposit removal shift line is carried out in order to improve vehicle handling during execution of deposit removal operations; however, deposit removal could instead be carried out when it does not affect the vehicle operability. That is, deposit removal could be carried out at time when the effects of internal combustion engine operating conditions on vehicle handling are minimal, such as during idling, or specific operating conditions such as deceleration.

In this case, since there is no need for shift control, control is simpler, and it becomes possible to execute deposit removal operations without affecting vehicle handling, even in a vehicle not equipped with automatic transmission.

E. Modifications:

The invention is not limited to the embodiments set forth hereinabove, and may be reduced to practice in various other modes without departing from the scope and spirit thereof, such as the following modifications, for example.

In the embodiments hereinabove, the need for a deposit removal operation is decided on the basis of the estimated value of air amount variation ΔVdep, but it would be possible instead to make the decision as to the need for a deposit removal operation depending on past operating status. For example, deposit removal operations may be executed at some suitable time period such as subsequent to operation at large valve overlap, operation while recirculating exhaust gas, or other operation in which the intake valve is exposed to gases including burned gases.

Additionally, in an internal combustion engine equipped with a fuel injection device for injecting fuel directly into combustion chambers, deposit removal operations may be executed subsequent to occurrence of a condition in which the intake valve is exposed to unburned gases, such as after purging of fuel vapors entering the intake system from the fuel tank.

In other words, deposit removal may be carried out subsequent to the occurrence of a condition in which deposits are likely to form, thereby avoiding excessive frequency of deposit removal operations. An advantage over the embodiments described above is simpler control, since measurement of the intake air amount is unnecessary. On the other hand, the embodiments offer an advantage over this variation, in that it is possible to remove deposits caused by factors largely unrelated to operating conditions, such as blow-by.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for performing control of an internal combustion engine, comprising:

a variable valve mechanism configured to variably set opening timing of an intake valve and an exhaust valve of the internal combustion engine; and a deposit removal executing section configured to execute a deposit removal operation by controlling the variable valve mechanism to increase velocity of intake air into cylinders of the internal combustion engine, thereby removing deposits adhering in proximity to the intake valve, wherein:

the deposit removal executing section increases the velocity of intake air by closing both the intake valve and the exhaust valve and retarding the opening timing of the intake valve after both the intake valve and the exhaust valve are closed, and the deposit removal executing section includes a parameter acquiring section configured to acquire a parameter relating to deposit amount, and to perform the deposit removal operation when the parameter acquired by the parameter acquiring section exceeds a predetermined value.

2. A control device according to claim 1, wherein the variable valve mechanism is able to vary valve lift of the intake valve.

3. A control device according to claim 1, wherein the deposit removal executing section increases the velocity of intake air by retarding the opening timing of the intake valve from the opening timing under same operating conditions of the engine during normal operation without the deposit removal operation.

4. A control device according to claim 1, wherein the deposit removal executing section increases the velocity of intake air by reducing valve lift of the intake valve.

5. A control device according to claim 1, wherein the deposit removal executing section decides timing for the deposit removal operation with reference to past operating status of the internal combustion engine.

6. A control device according to claim 5, wherein the deposit removal executing section performs the deposit removal operation after operation in which the intake valve of the internal combustion engine is exposed to gases including burned gases.

7. A control device according to claim 1, wherein the deposit removal executing section performs control of an automatic transmission during the deposit removal operation to increase a revolution of the internal combustion engine.

8. A vehicle control apparatus according to claim 7, wherein the automatic transmission is a continuously variable transmission.

9. A control device according to claim 1, wherein the deposit removal executing section performs the deposit removal operation during idling or during deceleration of the vehicle.

10. A control device for performing control of an internal combustion engine, comprising:
    a variable valve mechanism configured to variably set opening timing of an intake valve of the internal combustion engine; and
    a deposit removal executing section configured to execute a deposit removal operation by controlling the variable valve mechanism to increase velocity of intake air into cylinders of the internal combustion engine, thereby removing deposits adhering in proximity to the intake valve, wherein:
        the deposit removal executing section includes a parameter acquiring section configured to acquire a parameter relating to deposit amount, and to perform the deposit removal operation when the parameter acquired by the parameter acquiring section exceeds a predetermined value, and
        the parameter acquiring section includes an intake air amount acquiring section configured to acquire an intake air amount when the internal combustion engine is in a predetermined engine operation state, and wherein the parameter relating to deposit amount is a difference between the intake air amount acquired by the intake air amount acquiring section and a predetermined standard value for intake air amount.

11. A control device according to claim 10, wherein the parameter acquiring section corrects the standard value for intake air amount based on variation in the intake air amount due to aging characteristics of the internal combustion engine.

12. A control device according to claim 10, wherein the parameter acquiring section further includes a compensating section configured to compensate variation in air intake amount due to aging characteristics of the internal combustion engine by varying load on the internal combustion engine, and wherein the parameter relating to deposit amount is acquired in a state in which variation in the intake air amount due to aging characteristics of the internal combustion engine has been compensated by the compensating section.

13. A method of controlling an internal combustion engine including a variable valve mechanism configured to variably set opening timing of an intake valve and an exhaust valve of the internal combustion engine, the method comprising:
    executing a deposit removal operation by controlling the variable valve mechanism to increase velocity of intake air into cylinders of the internal combustion engine, thereby removing deposits adhering in proximity to the intake valve, wherein:
    the step of executing a deposit removal operation includes increasing the velocity of intake air by closing both the intake valve and the exhaust valve retarding the opening timing of the intake valve after both the intake valve and the exhaust valve are closed, and
    the step of executing a deposit removal operation includes the steps of acquiring a parameter relating to deposit amount and performing the deposit removal operation when the parameter relating to deposit amount exceeds a predetermined value.

14. A method according to claim 13, wherein the variable valve mechanism is able to vary valve lift of the intake valve.

15. A method according to claim 13, wherein the step of executing a deposit removal operation includes the step of increasing the velocity of intake air by retarding the opening timing of the intake valve from the opening timing under same operating conditions of the engine during normal operation without the deposit removal operation.

16. A method according to claim 13, wherein the step of executing a deposit removal operation includes the step of increasing the velocity of intake air by reducing valve lift of the intake valve.

17. A method according to claim 13, wherein the step of executing a deposit removal operation includes the step of deciding timing for the deposit removal operation with reference to past operating status of the internal combustion engine.

18. A method according to claim 17, wherein the step deciding timing for the deposit removal operation includes the step of performing the deposit removal operation after operation in which the intake valve of the internal combustion engine is exposed to gases including burned gases.

19. A method according to claim 13, further comprising increasing a revolution of the internal combustion engine by controlling an automatic transmission during the deposit removal operation.

20. A method according to claim 19, wherein the automatic transmission is a continuously variable transmission.

21. A method according to claim 13, wherein the deposit removal operation occurs during idling or during deceleration of the vehicle.

22. A method of controlling an internal combustion engine including a variable valve mechanism configured to variably set opening timing of a intake valve of the internal combustion engine, the method comprising:

executing a deposit removal operation by controlling the variable valve mechanism to increase velocity of intake air into cylinders of the internal combustion engine, thereby removing deposits adhering in proximity to the intake valve, wherein:

the step of executing a deposit removal operation includes the steps of acquiring a parameter relating to deposit amount and performing the deposit removal operation when the parameter relating to deposit amount exceeds a predetermined value, and the step of acquiring a parameter relating to deposit amount includes the step of acquiring the intake air amount when the internal combustion engine is in a predetermined engine operation state, and wherein the parameter relating to deposit amount is a difference between the intake air amount and a predetermined standard value for intake air amount.

23. A method according to claim 22, wherein the step of acquiring a parameter relating to deposit amount includes the step of correcting the standard value for intake air amount based on variation in the intake air amount due to aging characteristics of the internal combustion engine.

24. A method according to claim 22, wherein the step of acquiring a parameter relating to deposit amount includes the step of compensating for variation in air intake amount due to aging characteristics of the internal combustion engine by varying load on the internal combustion engine, and wherein the parameter relating to deposit amount is acquired in a state in which variation in the intake air amount due to aging characteristics of the internal combustion engine has been compensated.

* * * * *